UNITED STATES PATENT OFFICE.

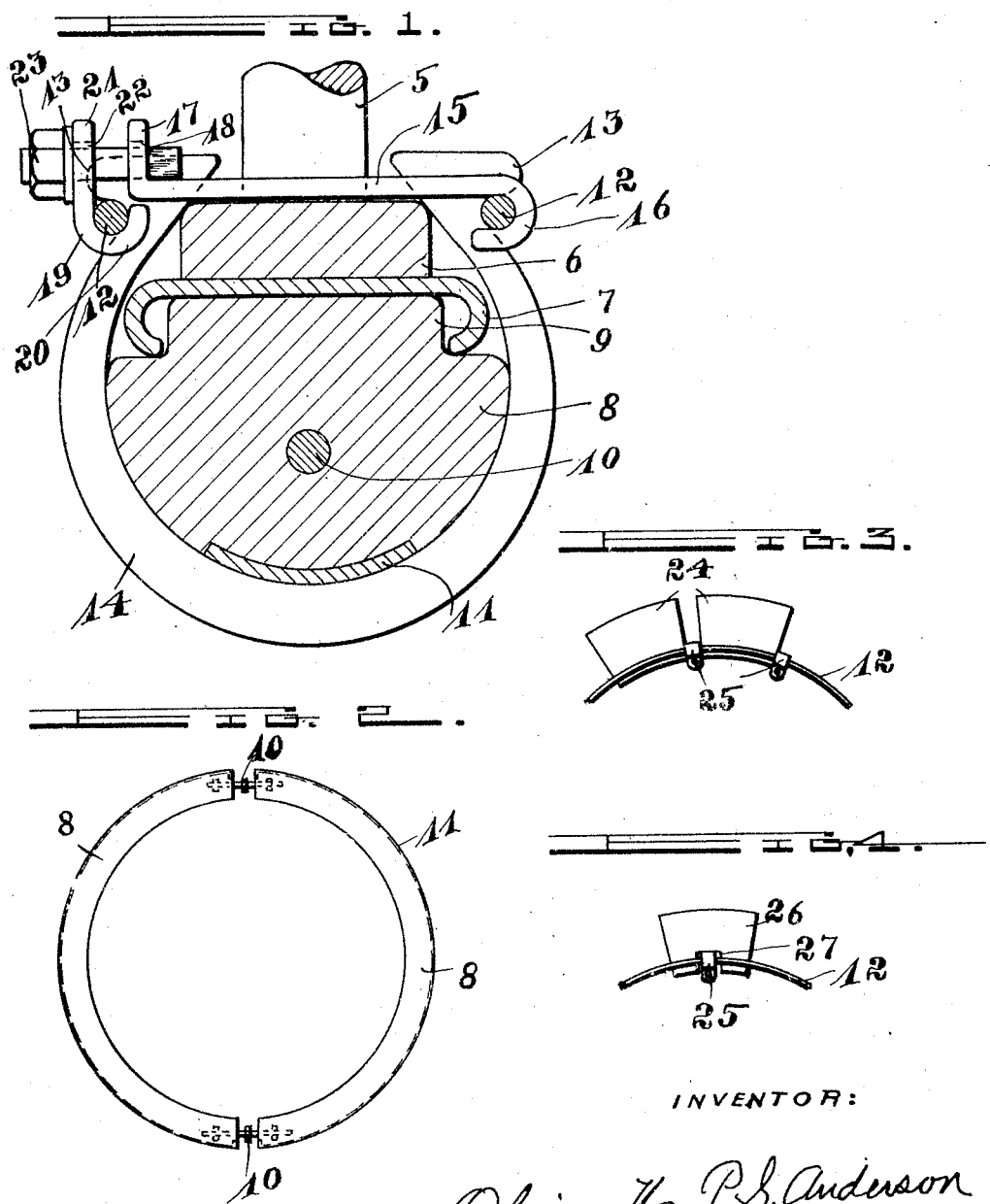

OLIVER H. P. S. ANDERSON, OF LOS ANGELES, CALIFORNIA.

TIRE CONSTRUCTION.

1,365,076.  Specification of Letters Patent.  Patented Jan. 11, 1921.

Application filed June 21, 1920. Serial No. 390,413.

*To all whom it may concern:*

Be it known that I, OLIVER H. P. S. ANDERSON, a citizen of the United States, residing at Los Angeles, in the county of Los Angeles and State of California, have invented a new and useful Tire Construction, of which the following is a specification.

This invention relates to devices forming the tread portion of wheels of vehicles.

One of the objects of this invention is to provide an inexpensive device to form such tread portion or member.

Another object is to provide such a member that can easily be applied to wheels.

Another object is to provide such a member constructed so that it can easily be exchanged.

Another object is to provide a device which can easily be applied to the rim of an automobile wheel, in emergency cases even to be used without any rubber tire of any kind.

Another object is to provide proper attaching means to make such a device easily applicable to wheels.

Another object is to provide a device of this kind of such a construction that the several parts and members of the device will so engage one with the other and the several parts combined in such a manner engage with the rim of a wheel as to allow the exchanging of certain portions of the rubber tire without disturbing other portions of the same rubber tire, the several portions of such rubber tire to form a continuous and complete rubber tire when so engaged within the device on a wheel.

Other objects will appear from the following description and appended claim as well as from the accompanying drawing, in which—

Figure 1 is a general cross sectional view of the device, which normally is radially through the rim of a wheel.

Fig. 2 is a side elevation of the filling member and emergency rim of the device.

Fig. 3 is a side elevation of two adjoining portions of the rubber tire of the device.

Fig. 4 is a side elevation of a portion of the rubber tire in slightly modified form.

It is normally rather expensive to carry an extra tire on an automobile, and then, at a time when such a tire is to be used, it becomes very disappointing to find that the inner tube of such an extra tire has become weak or leaky (perhaps in the valve of the tire) so as to make the whole extra tire absolutely useless after it has been carried along inactively for perhaps a long time.

This present invention is to do away with and eliminate such parts that may become ineffective or inoperative or useless when so carried along on a vehicle.

The spokes 5 of a wheel are normally united by a common felly 6, over which a suitably shaped tire-holding rim 7 is disposed in case of automobile wheels. Such a rim 7 is shaped very differently on automobile wheels according to the type of tires to be used (rubber tires having very much varying shape in their base edges, as clencher, and others), and it will easily be understood from the following description that the shape of this rim is immaterial and does not affect the principle of the device of this invention.

A filling member and emergency rim 8 is preferably constructed so as to fit on the rim 7 of such wheel with a suitably shaped portion as at 9. It will easily be understood that this portion 9 can be so shaped for different types of wheels as always to fit for such different types of wheels. The main body of the member 8 is provided with a rounded tread surface, and the outer face of this rounded portion is preferably provided with a steel rim 11, that is if the filling member is made of wood or other similar material, which is not exactly necessary, and it will easily be understood that if more solid material is used for the filling member 8 then the steel rim may be omitted. The filling member is furthermore preferably made in sections so as to make an appplying of the filling member and emergency rim to a wheel easy. In Fig. 2 is such an arrangement illustrated, showing the two sections interconnected by the bolts 10. Such bolts naturally are provided with left and right hand threads so as to screw into the oppositely disposed sections of the filling member 8 when turned in one direction while unscrewing from both sections when turned in the opposite direction. More than two sections can of course easily be provided so as not to require so much space for storing on a vehicle when not used on the wheels of the vehicle, as for extra tire or an emergency tire.

Having this filling member 8 so constructed, consisting of sections (and of several, or a suitable number of sections), and provided with such interconnecting bolts, it is of course easily understood that such a member can be used as an emergency tire for automobile wheels without any rubber tires, the several sections in such an emergency case simply being tightly secured on the rim 7 of the automobile wheel and being held together by the bolts 10.

A steel ring 12 is preferably provided on each side of the wheel in a position to easily engage the clencher bead 13 of a casing 14. Arranging such rings 12 in these positions engaged with the clencher beads 13 of a rubber casing, the rings of such a diameter as to prevent a disengaging of the casing from under the rings, naturally facilitates a securing of the casing to a wheel.

New rubber casings are however rather expensive, but inflating casings in the normal manner requires new casings as well as casings made of the best of materials, if expected to stand up properly.

I intend to eliminate such inflating of casings which naturally allows the use of less well constructed casings, and even allows the use of old casings. Furthermore, I prefer to cut such new or old casings in a suitable number of sections to make up a complete circle around the wheel on which I intend to use the several sections. The several sections are disposed over the rim of a wheel and over the filling member 8 (disposed over the rim of the wheel) in the manner illustrated in Figs. 1, 3 and 4. The rings 12 are then disposed so as to engage with the clencher beads of the several casing sections on both sides of the wheel, and the rings are then clamped together by suitable clamping means. In Fig. 1, the clamping member consists of a flat bar 15 provided with a hook end 16 engaged over the ring 12 on one side of the wheel extending over to the other side of the wheel, the other end 17 of the bar 15 being provided with a bent end 17 having a hole 18; a second bar 19 of similar material engaging with its hook end 20 over the ring 12 on the opposite side of the wheel, and having in its other end 21 a hole 22 to come into alinement with the hole in the first-named bar; the whole being engaged and interconnected by a bolt 23. The illustration in Fig. 3 is practically a side elevation of the cross sectional view in Fig. 1 in smaller scale, two sections 24 of a rubber casing being shown in relative position to one another, a portion of the ring 12 being also shown in proper position, all engaged by the clamping member 25, the clamping member 25 being disposed in the space between the two adjoining sections of the rubber casing. It will of course easily be understood that the sections of the casing can be so cut as to leave little or no space between the several sections in their tread surfaces when so placed together over a wheel while being spaced enough near the edges of the clenching portions of such casings as to leave room for the clamping members.

A slight modification of this is illustrated in Fig. 4 where suitable portions are cut out practically in the middle of the clencher edges of such section 26 as at 27, for the clamping member 25, this naturally without any further difficulty allowing a disposing of sections one butting against the other on a wheel when so disposed.

The clamping members, of course, can be of various shapes without departing from the principle of the invention, and, in emergency cases, even common wire can be inserted and tied around the two rings 12 so as to tightly engage them for engaging the several sections of the rubber tire.

Having thus described my invention, I claim:

In a tire construction, in combination with an automobile wheel having a rim suitable for securing rubber casings, a filling member made up of sections and provided with connecting means for securing the filling member to the rim of the wheel, a number of rubber casing sections disposed over the filling member and over the rim of the wheel, a wire ring disposed on each side of the wheel in a position to easily engage the clencher edges of the several casing sections, and a clamping member disposed between each pair of casing sections so as to reach from one side to the other side through the casing sections for clamping the rings one toward the other for securing the casing sections to the wheel.

In testimony that I claim the foregoing as my invention I have signed my name in the presence of two subscribing witnesses.

OLIVER H. P. S. ANDERSON.

Witnesses:
   T. A. LEWIS,
   C. R. JOHN.